(12) United States Patent
Chekansky (10) Patent No.: US 9,353,760 B2
(45) Date of Patent: May 31, 2016

(54) SPEED SENSOR INSERT WITH BEARING SPACER INDEXING FOR A TURBOCHARGER

(71) Applicant: BorgWarner Inc., Auburn Hills, MI (US)

(72) Inventor: Jason W. Chekansky, Asheville, NC (US)

(73) Assignee: Borg Warner Inc., Auburn Hills, MI (US)

( * ) Notice: Subject to any disclaimer, the term of this patent is extended or adjusted under 35 U.S.C. 154(b) by 0 days.

(21) Appl. No.: 14/420,825

(22) PCT Filed: Jul. 31, 2013

(86) PCT No.: PCT/US2013/052880
§ 371 (c)(1),
(2) Date: Feb. 10, 2015

(87) PCT Pub. No.: WO2014/028216
PCT Pub. Date: Feb. 20, 2014

(65) Prior Publication Data
US 2015/0204341 A1    Jul. 23, 2015

Related U.S. Application Data

(60) Provisional application No. 61/684,280, filed on Aug. 17, 2012.

(51) Int. Cl.
*F16C 19/38* (2006.01)
*F16C 19/52* (2006.01)
(Continued)

(52) U.S. Cl.
CPC .............. *F04D 29/056* (2013.01); *F01D 17/06* (2013.01); *F04D 17/08* (2013.01); *F04D 29/403* (2013.01); *F05D 2220/40* (2013.01); *G01P 3/446* (2013.01)

(58) Field of Classification Search
CPC .... F05D 2220/40; F01D 17/06; F04D 29/403; F04D 29/056; F04D 17/08; F16C 17/18; F16C 35/02; F16C 33/08; G01P 3/44
USPC ......... 384/282, 276, 448, 550, 562, 559, 569; 415/170.1
See application file for complete search history.

(56) References Cited

U.S. PATENT DOCUMENTS 4,240,678 A * 12/1980 Sarle ..................... F01D 25/166
384/369
4,256,441 A * 3/1981 Arora .................... F01D 25/166
384/276
(Continued)

FOREIGN PATENT DOCUMENTS

DE  WO 2012024092 A2 * 2/2012 ............. F16C 35/02
DE  WO 2012141846 A2 * 10/2012 ............. F01D 25/24
(Continued)

*Primary Examiner* — Marcus Charles
(74) *Attorney, Agent, or Firm* — Miller Canfield (57) ABSTRACT

A turbocharger bearing housing, including a bearing bore having two journal bearings located in the bearing bore and a tubular bearing spacer having first and second axial ends for spacing apart said journal bearings. The tubular bearing spacer having at least one radial opening and a mounting bore for receipt of a turbocharger shaft. The mounting bore further being capable of receiving a generally tubular insert mounted therein and extending into the at least one radial opening of the bearing spacer. The tubular insert further including an indexing surface to assist in setting the depth of insertion for a rotational speed sensor mounted therein via threaded fitting or friction fit and creating a set air gap between an end of the speed sensor and the rotating shaft.

6 Claims, 6 Drawing Sheets

(51) Int. Cl.
*F16C 41/00* (2006.01)
*G01P 3/44* (2006.01)
*F04D 17/08* (2006.01)
*F04D 29/056* (2006.01)
*F01D 17/06* (2006.01)
*F04D 29/40* (2006.01)

(56) References Cited

U.S. PATENT DOCUMENTS

| | | | | |
|---|---|---|---|---|
| 4,279,576 A | * | 7/1981 | Okano | F02B 37/00 324/179 |
| 4,486,147 A | * | 12/1984 | Byrne | F01D 5/025 403/268 |
| 4,722,630 A | * | 2/1988 | Fang | F01D 5/025 228/138 |
| 4,924,674 A | * | 5/1990 | Hara | F01D 15/10 322/31 |
| 6,017,184 A | * | 1/2000 | Aguilar | F01D 25/168 415/105 |
| 7,296,409 B2 | * | 11/2007 | Spooner | F01D 15/10 290/52 |
| 7,372,253 B2 | | 5/2008 | Biber et al. | |
| 7,753,591 B2 | * | 7/2010 | Petitjean | F01D 25/16 384/397 |
| 8,677,728 B2 | * | 3/2014 | Kovasity | F01D 15/10 415/173.2 |
| 2012/0060496 A1 | | 3/2012 | Hertweck et al. | |

FOREIGN PATENT DOCUMENTS

| | | |
|---|---|---|
| JP | 07325093 | 12/1995 |
| JP | 2005009527 | 1/2005 |
| JP | 2008309520 | 12/2008 |

* cited by examiner

SPEED SENSOR INSERT WITH BEARING SPACER INDEXING FOR A TURBOCHARGER

FIELD OF THE INVENTION

This invention provides an improved means for securing a turbocharger speed sensor which also secures a journal bearing spacer against rotation.

BACKGROUND OF THE INVENTION

Turbochargers are a type of forced induction system. They deliver air, at greater density than would be possible in the normally aspirated configuration, to the engine intake, allowing more fuel to be combusted, thus boosting the engine's horsepower without significantly increasing engine weight. This can enable the use of a smaller turbocharged engine, replacing a normally aspirated engine of a larger physical size, thus reducing the mass and aerodynamic frontal area of the vehicle.

The wheels in turbochargers are designed to operate at nearly maximum stress at the peak of the operating regime. This produces the best compromise between stress and mass, with respect to the design of the wheels, to provide the lowest inertia at the desired efficiency and pressure ratio for the wheels. The inference of this compromise is that the wheels of a turbocharger cannot be run in an overspeed condition or the wheels will be overstressed. Along with overstress conditions, comes the damage accumulation due to the speed cycles the wheels undergo. Damage accumulation is a major factor in low cycle fatigue (LCF) in turbocharger wheels.

The rotating assembly of a turbocharger rotates at exceptionally high speed in the order of 200,000 RPM for a small rotor and 80,000 RPM for a large rotor. Since the invention of the turbocharger, rotational speeds have climbed steadily. Transient response is a time based metric of the speed change for an accelerating or decelerating engine. The function of the turbocharger is a strong factor in engine transient response. A typical transient response measurement protocol is the time it takes for the engine to get from high idle engine speed to 80% of maximum torque. Because the turbocharger rotational speed is an important component in turbocharger transient response, the faster the speed of the turbocharger at engine high idle speed the shorter the time it takes to get to maximum engine torque. While this is a simplistic view, along with high turbocharger speed at engine high idle, comes high turbocharger speed at maximum engine torque; so the turbocharger must be protected from overspeed.

Before the advent of electronic engine controls, the selection and design of compressor wheels was rather simple with large margins of safety and large altitude compensation margins, so, in general, the wheels ran at comparatively sedate speed levels. With the introduction of electronic engine controls, it became possible to run the turbocharger at, or near, the design limit all the time so accumulation of damage in the wheel became acute, and LCF failures became more common.

Also introduced commercially were variable geometry turbochargers and regulated two stage turbochargers. In each of these cases, it became possible for a turbocharger to "overspeed". With a VTG, closing the vanes down accelerates the exhaust gas onto the turbine wheel blades causing the speed of the rotating assembly to increase. The rotating assembly is associated with inertia, and as a result there is a lag time between the closing of the vanes from high speed and the stop in acceleration of the rotating assembly, and this can cause a maximum speed overshoot. Further, with a regulated two stage turbo, the smaller stage is used for fast engine acceleration and the larger stage is used for supplying sufficient mass flow at the high end of the engine operating regime. If the changeover from small turbocharger to larger turbocharger is delayed, then the speeds of the small turbocharger can go out of range, and the turbo can overspeed.

Figure 1:
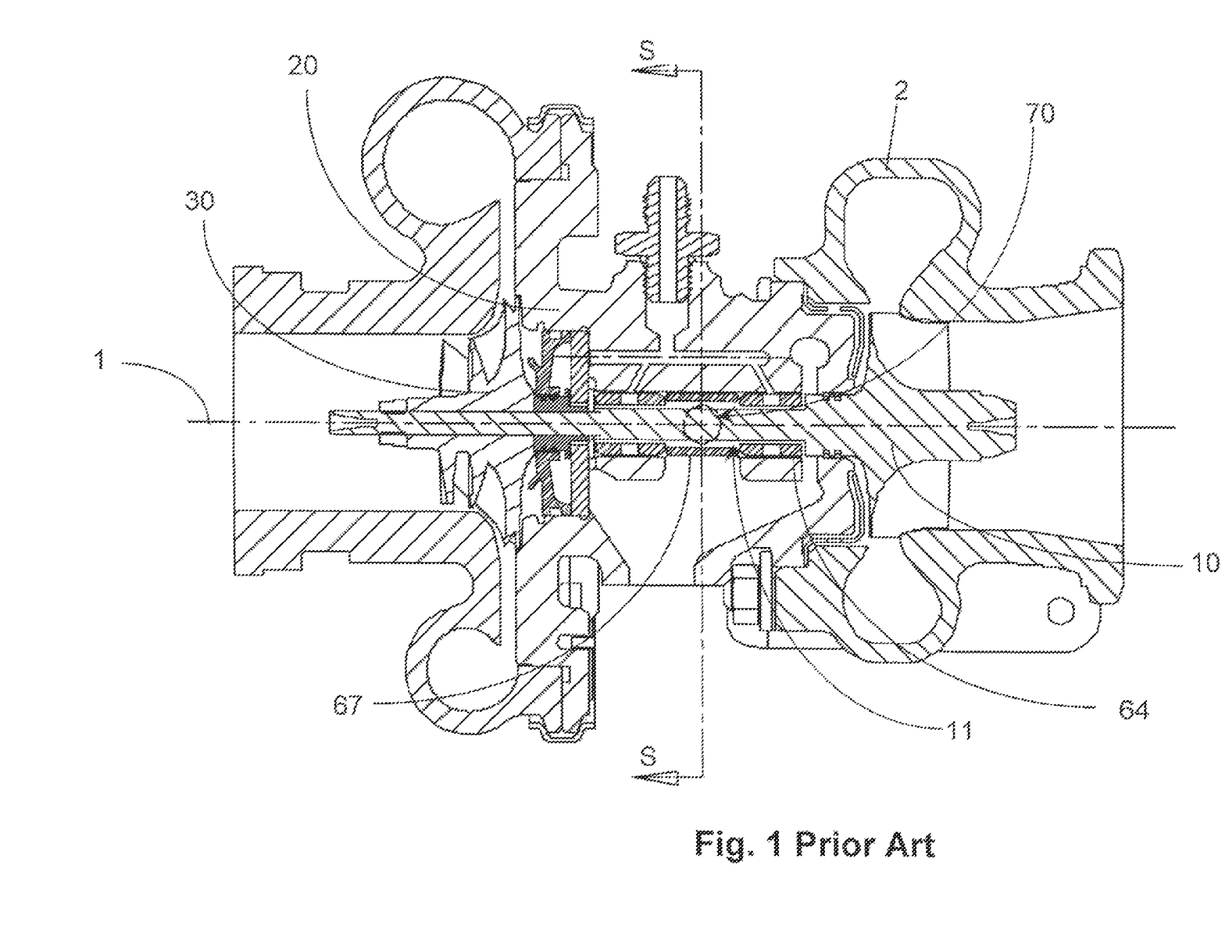
FIG. 1 depicts the section for a typical floating bearing turbocharger.
Figure 2:
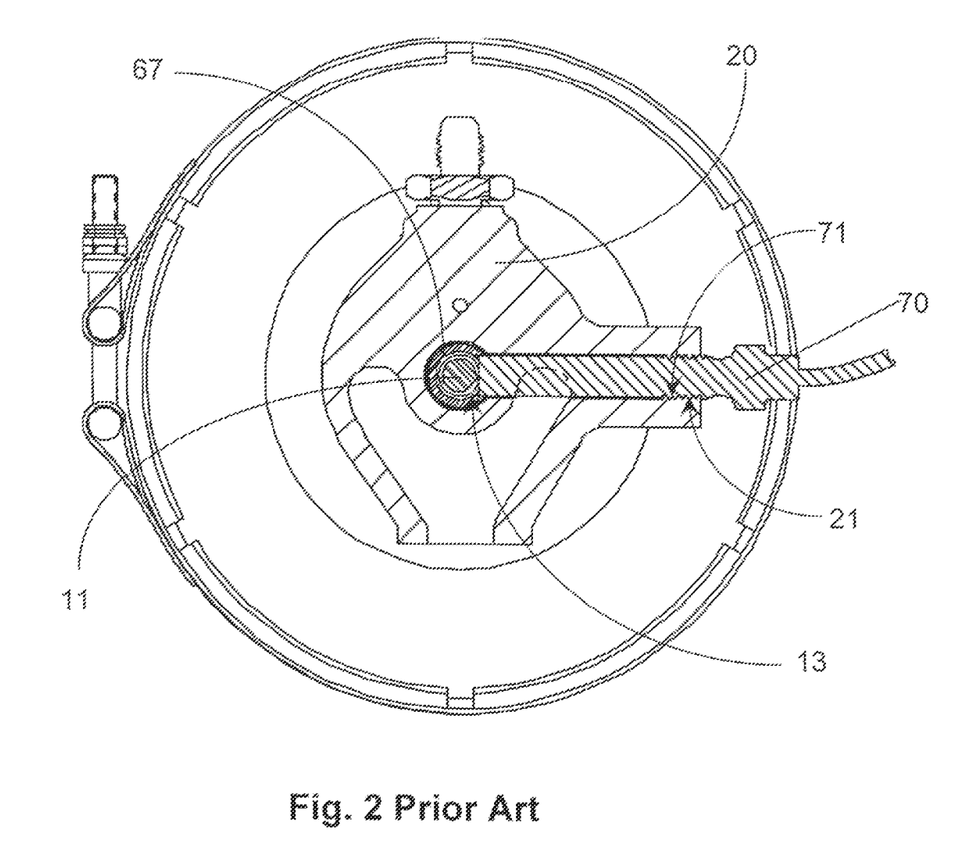
FIG. 2 depicts a, through section "S-S" of FIG. 1 of a typical turbocharger.

In order to exercise control over the speed of the rotating assembly, turbochargers are sometimes equipped with speed sensors. Speed sensors come in several types. Variable reluctance (VR) sensors use a coil around a magnet in the end of the sensor. As the rotating target cyclically gets closer and further from the magnet, the attraction forces change the shape of the magnetic field, which induces a measurable voltage in the coil. Another type is an electromagnetic sensor which reads the cyclic impedance of a flat on a rotating shaft. As depicted in FIGS. 1 and 2, the "shaft" (11) of the shaft and wheel which supports the journal bearings has a flat (13) fabricated into it approximately between the journal bearings (64). For symmetrical/balance/stress reasons, sometimes there are opposing flats fabricated into the shaft. In the above sensors types, the flat on the rotating shaft passes by the end (73) of the sensor, thus providing a signal as the distance from the end of the sensor to the proximate surface of the shaft (11) cyclically alters due to the difference in radius from the center of the shaft to the diameter of the shaft and then the flat (13) on the shaft. The signal emanating from the sensor (70) is transmitted to the engine electronic control system via a cable (75)

To fit the speed sensor (70) to a turbocharger bearing housing (20), the threaded portion (71) of the sensor (70) is threaded into a complementary threaded part (21) of the bore into which the speed sensor is located. The depth of the sensor is set and maintained by an inwards facing surface (76) on the sensor locating against an outwards facing abutment on the bearing housing (20). The "gap" between the inner end (73) of the sensor and the outer surface of the rotating shaft (11) must be both set and held constant for the sensor to operate consistently and accurately.

Figure 3:
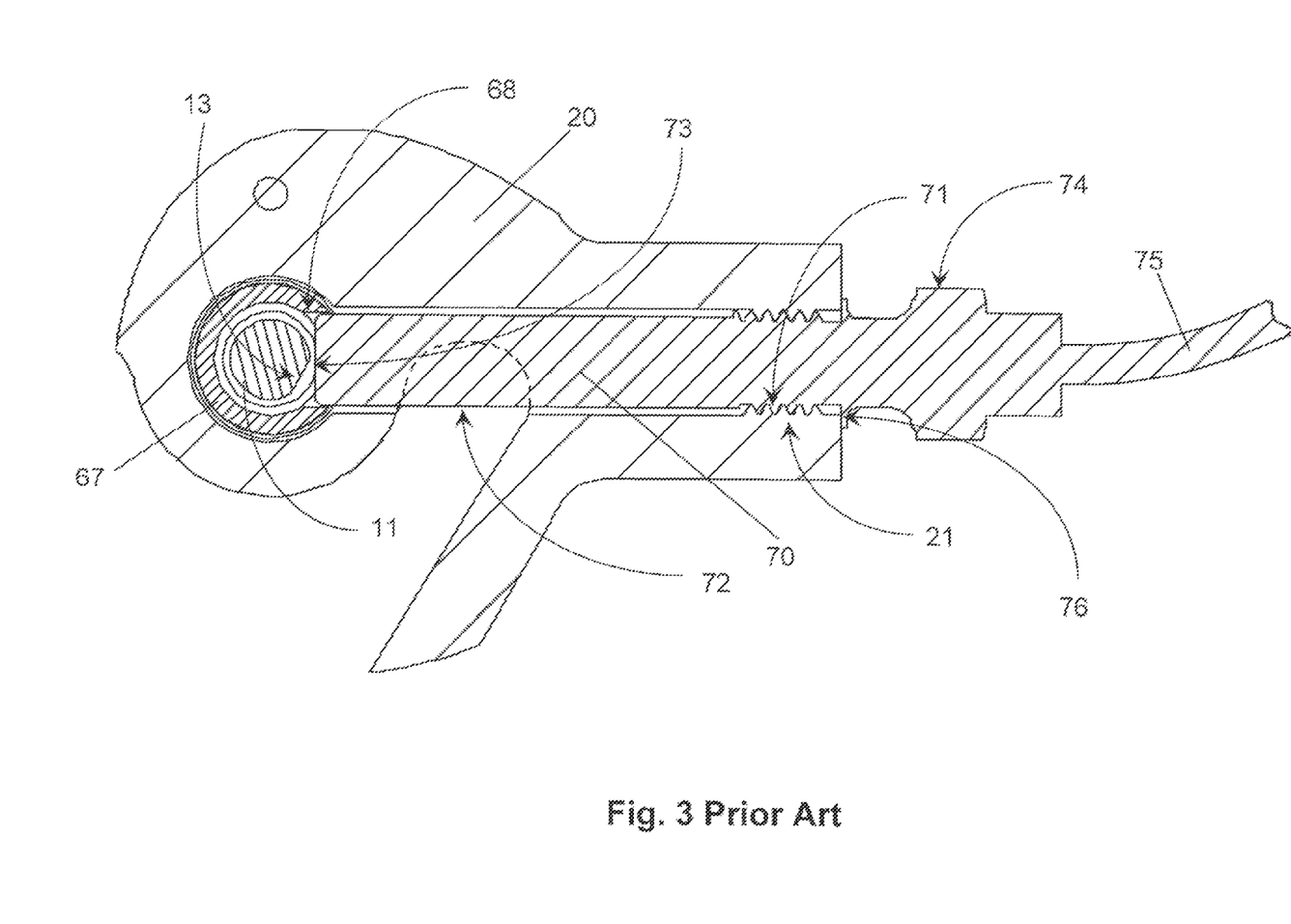
FIG. 3 depicts a magnified view of FIG. 2.

The end of the sensor (73), which is in the realm of 0.75 mm in diameter, generally must be within less than 1 mm proximity with the shaft surface. For designs in which the journal bearings (64) of the turbocharger are axially separated by a spacer (67), the spacer is typically fabricated from a ferrous metal which would shield the rotating shaft's flat-to-diameter cyclic distance variation. Accordingly, a window (68) is provided in the spacer, and the speed sensor tip protrudes through the window. The protrusion of the shaft (72) of the sensor (70) into the spacer (67) constrains the spacer from rotating about the turbocharger axis (1). In the assembly process the spacer is held in position (such that the window (68) in the spacer is aligned with the axis of the sensor) by a magnetic tool inserted into the journal bearing bore before the compressor-end journal bearing is assembled into the journal bearing bore.

Because such sensors are delicate electronic articles living in a thermally and vibrationally harsh environment, they are prone to failure. To replace the speed sensor (70), a technician must unscrew the sensor from the bearing housing (20) and replace the sensor by inserting the end (73) of the sensor (70) through the bearing housing and then spacer window (68). During the removal of the sensor, it is quite easy for the rotating assembly to move rotationally and drag the journal bearing spacer with said rotation, thus moving the window (68) in the spacer (67) from its prior alignment with the axis of the sensor. Since the spacer is at the bottom of a long bore, the technician can not see the position of the window in the spacer relative to the bore into which the sensor is fitted. Failure for the end of the sensor to pass through the window (68) in the spacer can result in damage to the sensor and potential damage to the spacer and bearings.

It is known from WO2012024092, assigned to the assignee of the present application, to fix a rotational speed sensor in a bearing housing recess, and to arrange a resilient sleeve in the bearing housing recess around the rotational speed sensor and engaging with one end into the sensor recess. However, once assembled, it is difficult to gain access to and remove the resilient sleeve for turbocharger overhaul.

Further, the fluctuating torque transmitted from the shaft to the bearing spacer during normal turbocharger operation causes the spacer to wearing and damage the outside of the sensor probe. There is a need to prevent such damage to the sensor probe.

SUMMARY OF THE INVENTION

The present invention provides a turbocharger in which the speed sensor can be removed for service while keeping in place the window in the journal bearing spacer through which the tip of the replacement speed sensor must be inserted. This is done through the use of an insert, which extends through the bearing housing and into the window in the spacer, and remains in place during removal of the speed sensor, so that the speed sensor can be re-installed with the tip of the sensor passing through the window in the spacer. The insert can also be easily removed for disassembly of the turbocharger.

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

To solve the problem of the journal bearing spacer rotating while the speed sensor is removed for service or replacement, the inventor generated a design of an insert which allows for the removal of the speed sensor while maintaining alignment of the spacer, thus allowing the speed sensor to be re-inserted through the spacer. Another advantage of the invention is that the insert prevents the spacer from wearing and damaging the outside of the sensor probe which would otherwise be caused by the fluctuating torque transmitted from the shaft to the bearing spacer during normal turbocharger operation. Accordingly, the durability of the speed sensor is improved, and the rate of failure, and the need for replacement, is reduced.

Figure 4:
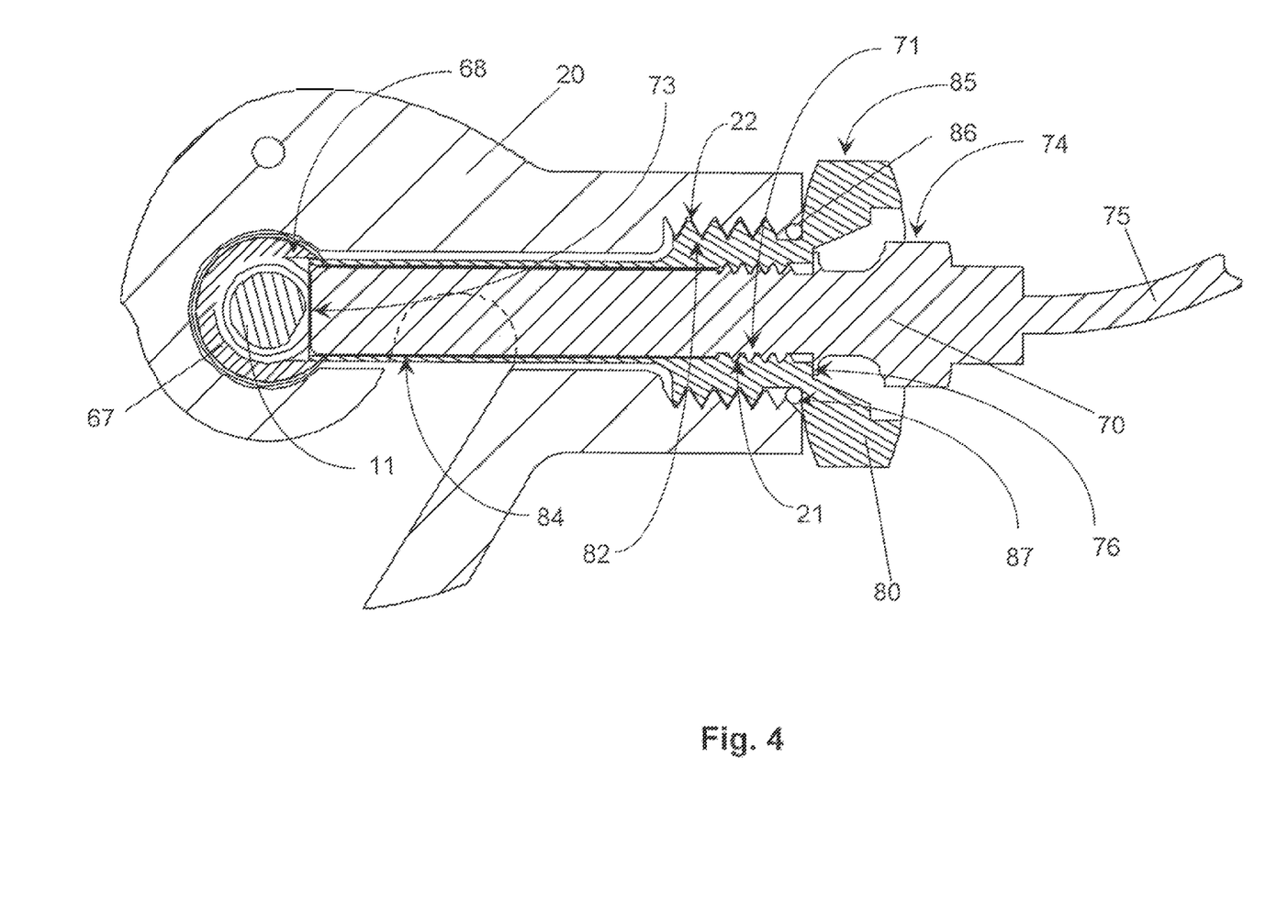
FIG. 4 depicts a magnified view of the inventive insert.

In a first embodiment of the invention, as depicted in FIG. 4, an insert (80) is screwed into the bearing housing (20) to provide a mount for the speed sensor (70). The insert (80) has a feature (85), such as a hex or flats, so that it can be rotated to be screwed into the bearing housing (20). The insert has an externally facing thread (82) which can be threaded into an internally facing complementary thread (22) in the bearing housing (20). In the preferred mode of the invention, the insert (80) is sealed to the bearing housing (20) by an "O" ring or other suitable means such as tapered threads (86), and the depth of the nose of the insert in the bearing housing (i.e. the distance from the shaft (11) axis) is controlled by the distance from the inward facing surface (87) of the nut or locating feature to the inner end of the insert (80). The inward facing surface (87) of the nut or locating feature is axially constrained by an abutment on the bearing housing (20). The sensor (70) has an externally facing thread (71) which can be threaded into an internally facing thread (21) in the insert.

When the sensor is threaded into the insert (80), a flange (76) on the sensor (80) abuts against an indexing surface (77) on the insert (80), thus setting the depth of the sensor (70) in the insert (80). As explained above, the depth of the insert (80) (in the bearing housing) is set in a similar method with the inwards facing surface (87) of the insert (80) abutting against an outwards facing surface of the bearing housing (20). Thus the resultant air gap between the end (73) of the sensor (70) and the rotating shaft (11) is set.

The lower end of the tubular part (84) of the insert locates in the window (68) of the spacer (67). When the sensor is removed, the insert remains in place, thus keeping the spacer window aligned with the axis of the sensor position so that the sensor can be re-inserted into its correctly operating position.

Figure 6:
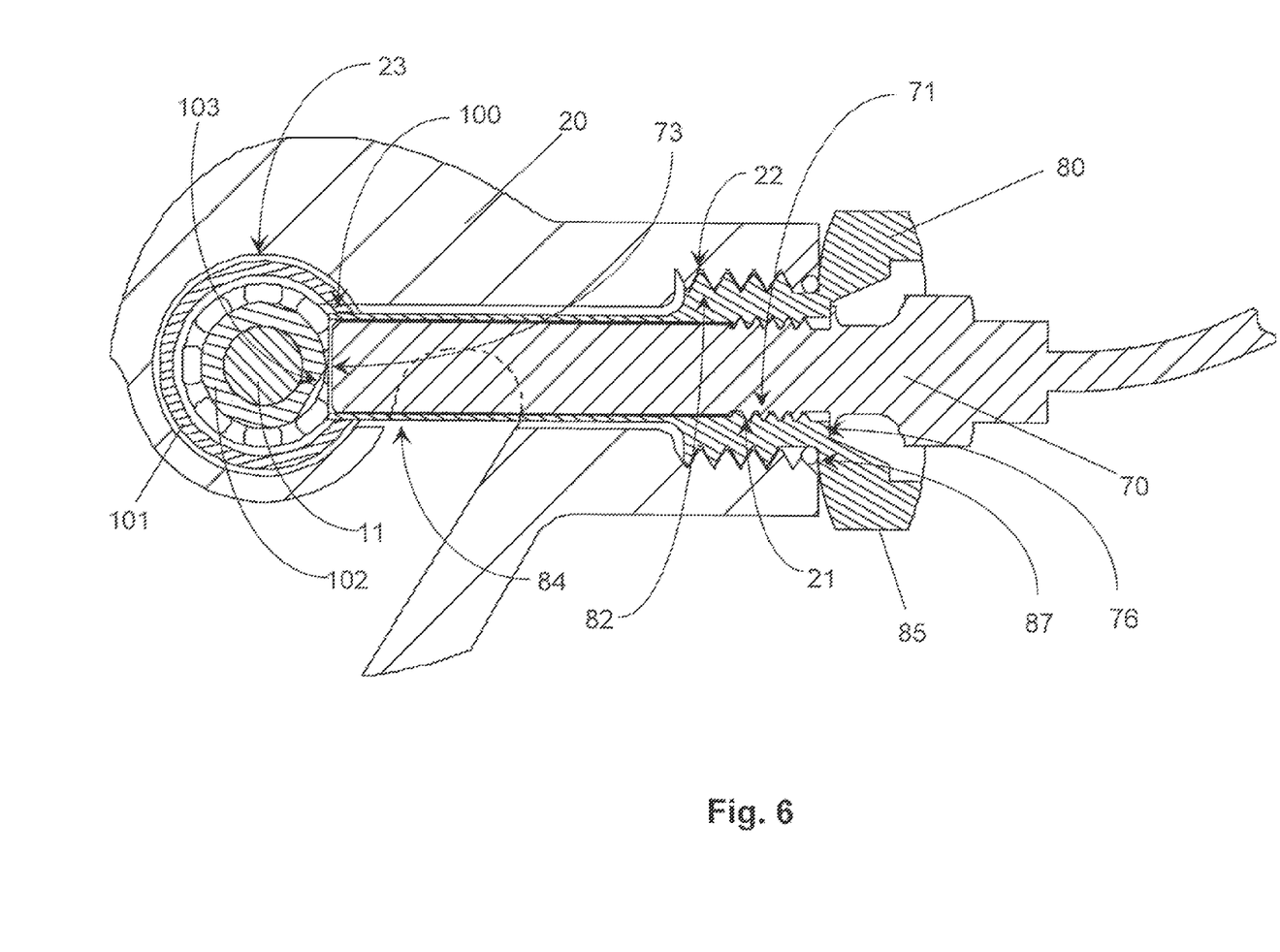
FIG. 6 depicts a magnified view of the second embodiment to the invention.

In a second embodiment of the invention, as depicted in FIG. 6, for sensing the speed of the rotating assembly in turbochargers equipped with rolling element bearings (REB), the outside diameter of the inner race is equipped with a flat for the purpose of creating a cyclic signal for sensing the rotational speed of the inner race and thus the rotating assembly. In the case in which the inner race is axially split onto two pieces, the flat can be on either inner race piece as long as the sensor axis is axially aligned with the axis of the center of the flat so that the sensor can read a cyclic signal.

In the second embodiment of the invention, the shaft (11) for the rotating assembly is supported and located in an inner race (102) of an REB assembly. The REB assembly (or cartridge) is located within a bore (23) in the bearing housing (20). Typically, the outside diameter of the outer race (101), or in some cases the outside diameter of a cartridge, which contains the outer race (101), is supported by an oil film for the purposes of damping the REB assembly. With no metal to metal contact between the outer surface of the outer race (or cartridge) and the bore (23) in the bearing housing, the outer race is completely unconstrained angularly and axially and is partially constrained radially. The inventor saw the opportunity to provide both axial and angular constraint to the REB outer race (or cartridge) while providing a mount for the speed sensor.

An insert (80) is screwed into the bearing housing (20) to provide a mount for the speed sensor (70). The insert (80) has a feature (85) such as a hex or flats so that it can be rotated to be screwed into the bearing housing (20). The insert has an externally facing thread (82) which can be threaded into an internally facing complementary thread (22) in the bearing housing (20). In the preferred mode of the invention, the insert (80) is sealed to the bearing housing (20) by an "O" ring (86), and the depth of the nose of the insert in the bearing housing (i.e. the distance from the shaft (11) axis) is controlled by the distance from the inwards facing surface (87) of the nut or locating feature to the inner end of the insert (80). The inwards facing surface (87) of the nut or locating feature is axially constrained by an abutment on the bearing housing (20). The sensor (70) has an externally facing thread (71) which can be threaded into an internally facing thread (21) in the insert.

When the sensor is threaded into the insert, an inwards facing surface (76) on the sensor abuts an outwards facing surface on the insert, thus setting the depth of the sensor in the insert. The depth of the insert (in the bearing housing) is set in a similar method with the inwards facing surface (87) of the insert abutting an outwards facing surface of the bearing housing. Thus the resultant air gap between the end (73) of the sensor and the rotating inner race (102) is set.

The end of the tubular part (84) of the insert locates in the window (100) of the outer race (101), thus keeping the outer race window (100) aligned with the axis of the sensor so that the sensor can be re-inserted into its correctly operating position. In a manner similar to the assembly of the sensor directly into the bearing housing, the outer race (101) of the REB is held in position (such that the window (100) in the outer race is aligned with the axis of the sensor) by a magnetic tool inserted into the REB bore (23) before the closure to the REB is assembled.

In this design, the tubular end (84) of the insert (80) thus provides a means of keeping the window (100) in the outer race aligned with the axis of the speed sensor (enabling simple service replacement of the speed sensor) while also providing axial and angular constraint for the outer race (or cartridge) relative to the bearing housing (20).

Figure 5:
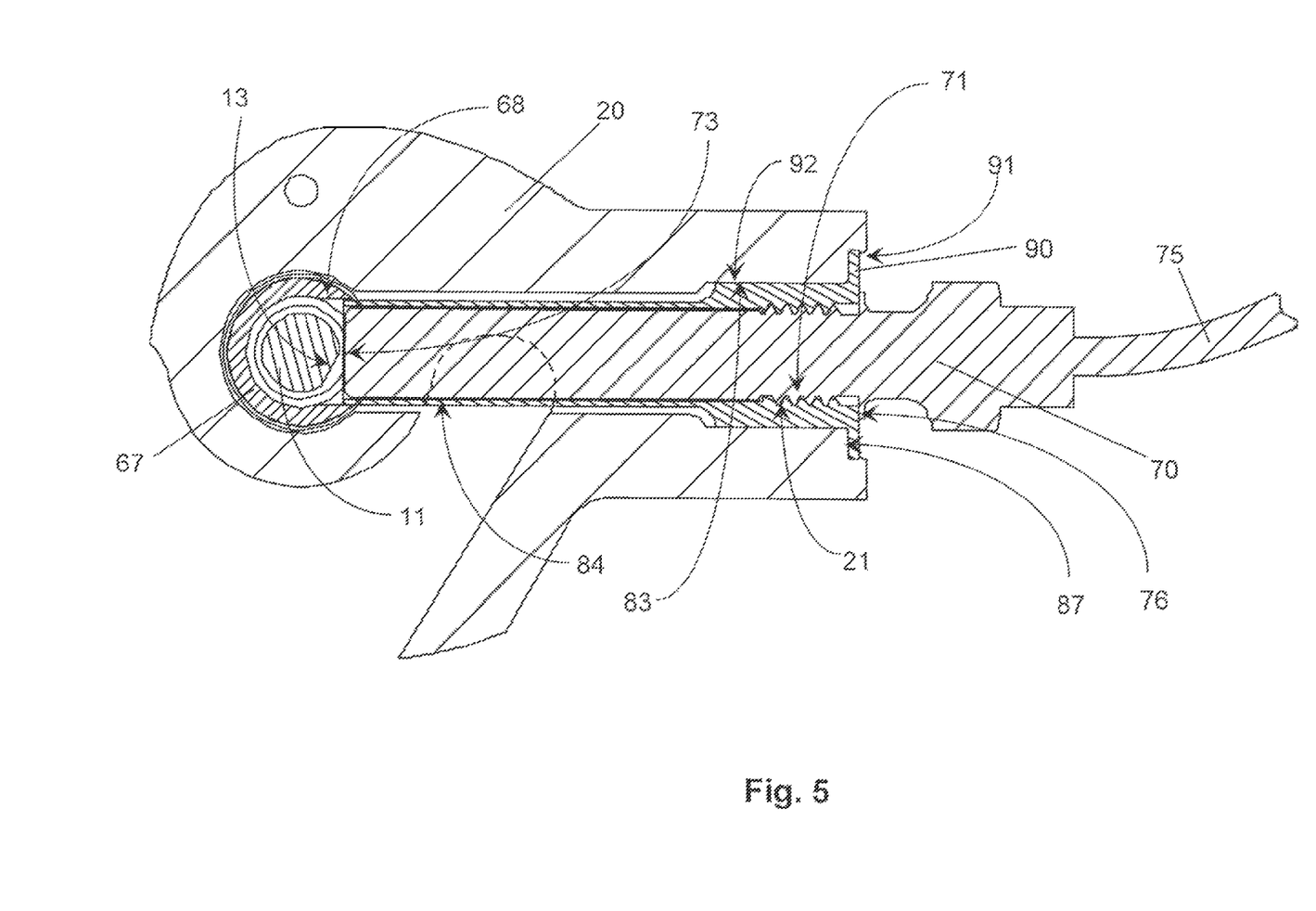
FIG. 5 depicts a magnified view of a variation on the inventive insert.

In a variation of the first embodiments of the invention, the insert (80) can be pressed or staked into the bearing housing (20) or soldered or welded, a s long as the axial air gap dimension between the end (73) of the sensor (80) and the outside surface of the shaft (11)is maintained and the interface provides for an oil tight seal with the bearing housing (20) to prevent oil leakage. Towards the outer end of the insert (80) is a generally cylindrical outside surface (83), which is pressed into a generally cylindrical bore (92), concentric with the axis of the speed sensor (80) in the bearing housing (20) to provide alignment with the desired axis of the sensor (80). The insert (70) is constrained in an outward direction by staking (91) of the bearing housing material over the outward facing surface of the flange (90).

In further variations to the design, the insert (80) could be constrained in the bearing housing in an outward direction by other mechanical or chemical means such as welding or bonding, or by simply a greater shrink fit of the bore (92) with the surface (83) of the outside of the insert.

Now that the invention has been described,

I claim:

1. A turbocharger bearing housing, including
   a bearing bore,
   two journal bearings located in the bearing bore,
   a tubular bearing spacer having first and second axial ends for spacing apart said journal bearings, and having at least one radial opening,
   a mounting bore,
   a generally tubular insert mounted in the mounting bore and extending into the at least one radial opening of the bearing spacer, and
   a rotational speed sensor mounted to the tubular insert via threaded fitting or friction fit; wherein a flange of the speed sensor abuts against an indexing surface of the tubular insert so as to set a depth of penetration of the speed sensor within the tubular insert.

2. The turbocharger as in claim 1, wherein the generally tubular insert is mounted in the mounting bore by a screw fit, a friction fit, a pressed fit or by bonding, staking, or welding.

3. The turbocharger as in claim 1, wherein the insert has internal threading and external threading.

4. The turbocharger as in claim 1, wherein the bearing housing has an outer surface, the tubular insert includes a segment projecting outwards beyond the outer surface of the bearing housing, and wherein said projecting segment includes features for engagement of said insert for rotation.

5. The turbocharger as in claim 4, wherein said features for engagement of said insert for rotation comprise one or more flat surfaces.

6. The turbocharger as in claim 5, wherein said flat surfaces form a hexagon.

* * * * *